(12) United States Patent
Agarwal et al.

(10) Patent No.: US 12,468,285 B2
(45) Date of Patent: Nov. 11, 2025

(54) INTERSECT COMMAND VISION LOCATING SYSTEM AND METHOD

(71) Applicant: Illinois Tool Works Inc., Glenview, IL (US)

(72) Inventors: Sunny Agarwal, Franklin, MA (US); John Anthony Cronin, Franklin, MA (US)

(73) Assignee: Illinois Tool Works Inc., Glenview, IL (US)

( * ) Notice: Subject to any disclaimer, the term of this patent is extended or adjusted under 35 U.S.C. 154(b) by 398 days.

(21) Appl. No.: 18/118,954

(22) Filed: Mar. 8, 2023

(65) Prior Publication Data

US 2024/0302816 A1   Sep. 12, 2024

(51) Int. Cl.
*G05B 19/4099*   (2006.01)

(52) U.S. Cl.
CPC ............... *G05B 19/4099* (2013.01); *G05B 2219/45235* (2013.01)

(58) Field of Classification Search
CPC ............... G05B 19/4099; G05B 2219/45235
See application file for complete search history.

(56) References Cited

U.S. PATENT DOCUMENTS

| | | | |
|---|---|---|---|
| 2014/0060144 A1 | 3/2014 | Bloom et al. | |
| 2014/0093638 A1* | 4/2014 | Bloom | H05K 3/0008 |
| | | | 118/713 |
| 2014/0094963 A1 | 4/2014 | Bloom | |
| 2019/0191597 A1 | 6/2019 | Han et al. | |

OTHER PUBLICATIONS

Computer Vision Techniques in Manufacturing, Zhou et al. (Year: 2022).*

* cited by examiner

*Primary Examiner* — Ming Shui
(74) *Attorney, Agent, or Firm* — Lando & Anastasi, LLP (57) ABSTRACT

A method of depositing material on an electronic substrate with a dispensing system includes acquiring images of adjacent features, assigning programmed search boxes to edges of the features, identifying programmed edges of the features, for each feature identifying an intersection point of the programmed edges, determining a centerline from the intersection point, determining a midpoint of the, determining an intersect command for a dispense operation between the first component and the second component, and performing the dispense operation.

18 Claims, 8 Drawing Sheets

| | Camera FOV |
| --- | --- |
| —— | Programmed edges |
| | Programmed search boxes for edges |
| + | Intersection point |
| - - - - - | Center line across two adjacent intersection points |
| • | Midpoint of two adjacent intersection points to determine Start and End point of line |
| – – – – | Line command |

INTERSECT COMMAND VISION LOCATING SYSTEM AND METHOD

BACKGROUND OF THE DISCLOSURE

1. Field of the Disclosure

This disclosure relates generally to apparatus and methods for dispensing a viscous material on an electronic substrate, such as a printed circuit board, and more particularly to an apparatus and a method for dispensing material on an electronic substrate with a dispensing unit configured to locate objects on the electronic substrate without the benefit of obtaining an image of the entire object.

2. Discussion of Related Art

There are several types of dispensing systems used to dispense precise amounts of liquid or paste for a variety of applications. One such application is the assembly of integrated circuit chips and other electronic components onto circuit board substrates. In this application, automated dispensing systems are used for dispensing dots of liquid epoxy or solder paste, or some other related material, onto printed circuit boards. Automated dispensing systems are also used for dispensing lines of underfill materials and encapsulants, which may be used to mechanically secure components to the printed circuit board. Exemplary dispensing systems described above include those manufactured and distributed by Illinois Tool Works Electronic Assembly Equipment (ITW EAE), with offices at Hopkinton, Massachusetts.

In a typical dispensing system, a dispensing unit is mounted to a moving assembly or gantry for moving the dispensing unit along three mutually orthogonal axes (x-axis, y-axis, and z-axis) using servomotors controlled by a computer system or controller. To dispense a dot of liquid on a printed circuit board or other substrate at a desired location, the dispensing unit is moved along the co-planar horizontal x-axis and y-axis directions until the dispensing unit is located over the desired location. The dispensing unit is then lowered along the perpendicularly oriented vertical z-axis direction until a nozzle/needle of the dispensing unit and dispensing system is at an appropriate dispensing height over the electronic substrate. The dispensing unit dispenses a dot of liquid, is then raised along the z-axis, moved along the x- and y-axes to a new location, and is lowered along the z-axis to dispense the next liquid dot. For applications such as encapsulation or dispensing of underfill as described above, the dispensing unit is typically controlled to dispense lines of material as the dispensing unit is moved in the x- and y-axes along the desired path of the lines. For some types of dispensing units, such as jetting pumps, the z-axis movement prior to and subsequent to a dispense operation may not be required.

Vision systems are used to locate objects on the electronic substrate. Current vision algorithms can locate edges of an object only but not the intersection point based on two non-parallel edges. A line can be drawn parallel to the edge, but if parts are skewed with respect to each other, the offset line cannot be in the center of the cavity gap. For material to flow evenly across the adjacent parts, a needle tip should be positioned in the center of gap all the time during the dispensing process. If not, then this could lead to uneven coverage across the chips and sometimes needle tip damage.

SUMMARY OF THE DISCLOSURE

One aspect of the present disclosure is directed to a method of depositing material on an electronic substrate with a dispensing system of the type including a frame, a dispensing unit gantry movably coupled to the frame, a dispensing unit coupled to the dispensing unit gantry, the dispensing unit being configured to deposit material onto the electronic substrate during a dispense operation, a vision system gantry coupled to the frame, and a vision system coupled to the vision system gantry. The vision system is configured to obtain one or more images of the electronic substrate having two adjacent features prior to performing the dispense operation. In one embodiment, the method comprises: acquiring a first image of a first portion of two adjacent features including a first feature of a first component and a second feature of a second component; acquiring a second image of a second portion of two adjacent features including a third feature of the first component and a fourth feature of the second component; assigning programmed search boxes to edges of the first feature and to edges of the second feature; assigning programmed search boxes to edges of the third feature and to edges of the fourth feature; identifying programmed edges of the first feature and the second feature, each of the first feature and the second feature including a horizontal programmed edge and a vertical programmed edge; identifying programmed edges of the third feature and the fourth feature, each of the third feature and the fourth feature including a horizontal programmed edge and a vertical programmed edge; for each of the first feature and the second feature, identifying an intersection point of the horizontal programmed edge and the vertical programmed edge; determining a first centerline from the intersection point of the first feature to the intersection point of the second feature; for each of the third feature and the fourth feature, identifying an intersection point of the horizontal programmed edge and the vertical programmed edge; determining a second centerline from the intersection point of the third feature to the intersection point of the fourth feature; determining a midpoint of the first centerline; determining a midpoint of the second centerline; determining an intersect command for a dispense operation between the first component and the second component; and performing the dispense operation.

Embodiments of the method further may include, for each intersection point of the first feature and the second feature, and for each intersection point of the third feature and the fourth feature, measuring an offset distance from the intersection point in a direction perpendicular to an edge of the feature. The offset distance may be negative, positive or zero. For each intersection point of the first feature and the second feature, and for each intersection point of the third feature and the fourth feature, the method further may include measuring a position distance from the intersection point in one of two directions from an edge of the feature. The position distance in an upward direction from the intersect point may be positive and the position distance in a downward direction from the intersection point may be negative. The position distance in a righthand direction from the intersect point may be positive and the position distance in a lefthand direction from the intersection point may be negative. Each image is composed of pixels with each pixel being the smallest picture element the vision system can uniquely identify and interpreted as Black or White with shades of gray. A user can select an edge from several edges from a graphic user interface. The edge may be one of a vertical edge from a plurality of vertical edges and a horizontal edge from a plurality of horizontal edges. The method further may include generating a model template of the edge.

Another aspect of the present disclosure is directed to a computer-readable medium comprising instructions which, when executed by a computer, cause the computer to carry out the method of: acquiring a first image of a first portion of two adjacent features including a first feature of a first component and a second feature of a second component; acquiring a second image of a second portion of two adjacent features including a third feature of the first component and a fourth feature of the second component; assigning programmed search boxes to edges of the first feature and to edges of the second feature; assigning programmed search boxes to edges of the third feature and to edges of the fourth feature; identifying programmed edges of the first feature and the second feature, each of the first feature and the second feature including a horizontal programmed edge and a vertical programmed edge; identifying programmed edges of the third feature and the fourth feature, each of the third feature and the fourth feature including a horizontal programmed edge and a vertical programmed edge; for each of the first feature and the second feature, identifying an intersection point of the horizontal programmed edge and the vertical programmed edge; determining a first centerline from the intersection point of the first feature to the intersection point of the second feature; for each of the third feature and the fourth feature, identifying an intersection point of the horizontal programmed edge and the vertical programmed edge; determining a second centerline from the intersection point of the third feature to the intersection point of the fourth feature; determining a midpoint of the first centerline; determining a midpoint of the second centerline; determining an intersect command for a dispense operation between the first component and the second component; and performing the dispense operation.

Embodiments of the computer-readable medium further may include, for each intersection point of the first feature and the second feature, and for each intersection point of the third feature and the fourth feature, measuring an offset distance from the intersection point in a direction perpendicular to an edge of the feature. The offset distance may be negative, positive or zero. For each intersection point of the first feature and the second feature, and for each intersection point of the third feature and the fourth feature, the method further may include measuring a position distance from the intersection point in one of two directions from an edge of the feature. The position distance in an upward direction from the intersect point may be positive and the position distance in a downward direction from the intersection point may be negative. The position distance in a righthand direction from the intersect point may be positive and the position distance in a lefthand direction from the intersection point may be negative. Each image is composed of pixels with each pixel being the smallest picture element the vision system can uniquely identify and interpreted as Black or White with shades of gray. A user can select an edge from several edges from a graphic user interface. The edge may be one of a vertical edge from a plurality of vertical edges and a horizontal edge from a plurality of horizontal edges. The method further may include generating a model template of the edge.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION OF THE DISCLOSURE

Various embodiments of the present disclosure are directed to viscous material dispensing systems, devices including dispensing systems. Embodiments disclosed herein are directed to techniques for dispensing material on an electronic substrate by a dispensing system. Such dispensing systems are configured to dispense an assembly material (e.g., solder paste, conductive ink, adhesive, or encapsulation material) onto an electronic substrate (e.g., a printed circuit board, referred to herein as an "electronic substrate," a "circuit board," a "board," a "PCB," a "PCB substrate," a "substrate," or a "PCB board") or to perform other operations. Specifically, embodiments of the present disclosure are described below with reference to dispensing system, sometimes referred to as "dispensers," used to produce printed circuit boards.

For the purposes of illustration only, and not to limit the generality, the present disclosure will now be described in detail with reference to the accompanying figures. This disclosure is not limited in its application to the details of construction and the arrangement of components set forth in the following description or illustrated in the drawings. The principles set forth in this disclosure are capable of other embodiments and of being practiced or carried out in various ways. Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

Figure 1:
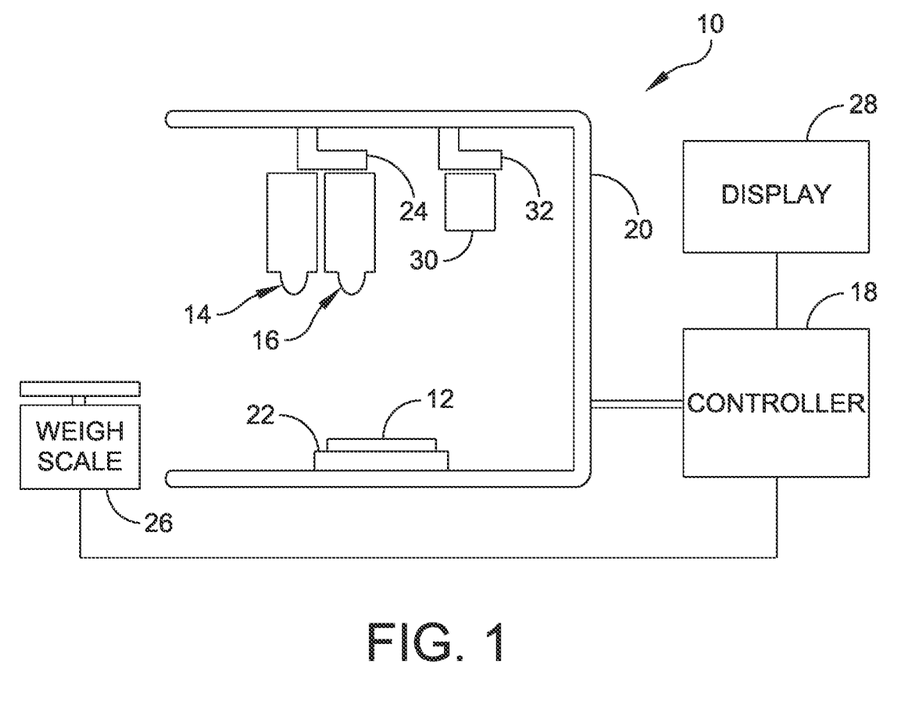
FIG. 1 is a schematic view of a dispensing system.

FIG. 1 schematically illustrates a dispensing system, generally indicated at 10, according to one embodiment of the present disclosure. The dispensing system 10 is used to dispense a viscous material (e.g., an adhesive, encapsulant, epoxy, solder paste, underfill material, etc.) or a semi-viscous material (e.g., soldering flux, etc.) onto an electronic substrate 12, such as a printed circuit board or semiconductor wafer. The dispensing system 10 may alternatively be used in other applications, such as for applying automotive gasketing material or in certain medical applications or for applying conductive inks. It should be understood that references to viscous or semi-viscous materials, as used herein, are exemplary and intended to be non-limiting. In one embodiment, the dispensing system 10 includes first and second dispensing units, generally indicated at 14 and 16, respectively, and a controller 18 to control the operation of the dispensing system. It should be understood that dispensing units also may be referred to herein as dispensing pumps and/or dispensing heads. Although two dispensing units are shown, it should be understood that a single dispensing unit or multiple dispensing units can be employed.

The dispensing system 10 may also include a frame 20 having a base or support 22 for supporting the electronic substrate 12, a dispensing unit gantry 24 movably coupled to the frame 20 for supporting and moving the dispensing units 14, 16, and a weight measurement device or weigh scale 26 for weighing dispensed quantities of the viscous material, for example, as part of a calibration procedure, and providing weight data to the controller 18. A conveyor system (not shown) or other transfer mechanism, such as a walking beam, may be used in the dispensing system 10 to control loading and unloading of electronic substrates to and from the dispensing system. The gantry 24 can be moved using motors under the control of the controller 18 to position the dispensing units 14, 16 at predetermined locations over the electronic substrate. The dispensing system 10 may include a display unit 28 connected to the controller 18 for displaying various information to an operator. There may be an optional second controller for controlling the dispensing units. Also, each dispensing unit 14, 16 can be configured with a z-axis sensor, e.g., a laser, to detect a height at which the dispensing unit is disposed above the electronic substrate 12 or above a feature mounted on the electronic substrate. The z-axis sensor is coupled to the controller 18 to relay information obtained by the sensor to the controller.

Prior to performing a dispensing operation, as described above, the electronic substrate, e.g., the printed circuit board, must be aligned or otherwise in registration with a dispensing unit of the dispensing system. The dispensing system further includes a vision system 30, which, in one embodiment, is coupled to a vision system gantry 32 movably coupled to the frame 20 for supporting and moving the vision system. In another embodiment, the vision system 30 may be provided on the dispensing unit gantry 24. As described, the vision system 30 is employed to verify the location of landmarks, known as fiducials, targets or reference points, on the electronic substrate. Once located, the controller can be programmed to manipulate the movement of one or more of the dispensing units 14, 16 to dispense material on the electronic substrate.

Systems and methods of the present disclosure are directed to dispensing material onto an electronic substrate, e.g., a printed circuit board. The description of the systems and methods provided herein reference exemplary electronic substrates 12 (e.g., printed circuit boards), which are supported on the support 22 of the dispensing system 10. In one embodiment, the dispense operation is controlled by the controller 18, which may include a computer system configured to control material dispensing units. In another embodiment, the controller 18 may be manipulated by an operator. The controller 18 is configured to manipulate the movement of the vision system gantry 32 to move the vision system so as to obtain one or more images of the electronic substrate 12. The controller 18 further is configured to manipulate the movement of the dispensing unit gantry 24 to move the dispensing units 14, 16 to perform dispensing operations.

The methods disclosed herein further support the use of various types of dispensing units, including, but not limited to, auger, piston, time and pressure, and jetting pumps.

In one embodiment, an exemplary dispensing system described herein may embody Camalot® dispensing systems, such as PRODIGY™ dispensers, sold by ITW EAE of Hopkinton, Massachusetts.

One particular challenge is to place a dispenser needle or nozzle tip in the center every time during production running different batch of parts with varying gaps. This often can only be resolved by finding the adjacent intersection points and locate the midpoint on the connecting line across these two intersection points.

Embodiments of a method disclosure herein locates the corners of the object with help of two programmed edges to find the intersection point. Those adjacent intersection points help to locate the midpoints at either end which would be the start and end of a line between the start and the end. The two found intersection points can be in different camera field of view which provides most flexibility to the user to program on bigger parts.

Figure 2A:
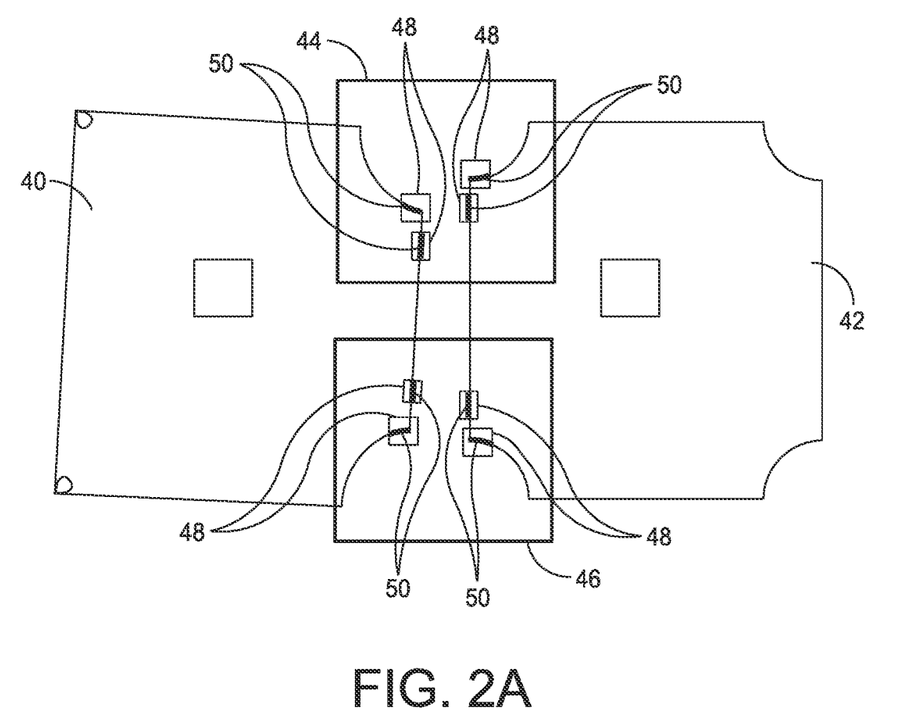
FIG. 2A is a schematic representation of two components on an electronic substrate showing two images each having programmed edges.
Figure 2B:
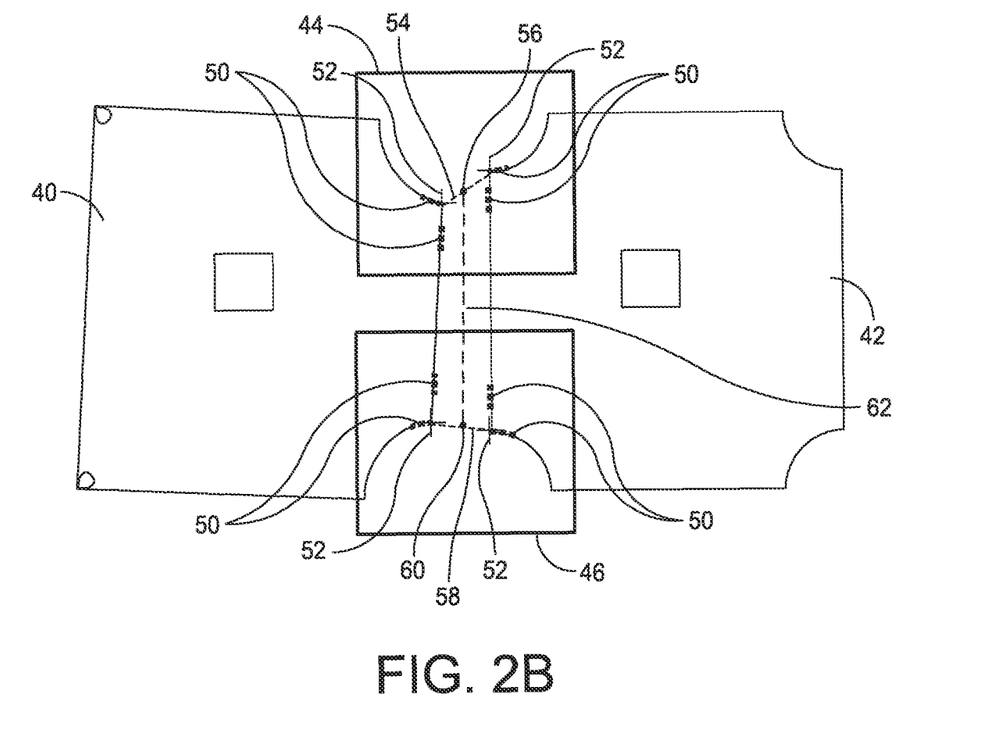
FIG. 2B is a schematic representation of the two components on the electronic substrate shown in FIG. 2A showing the intersection points of edges of the components.
Figure 2C:
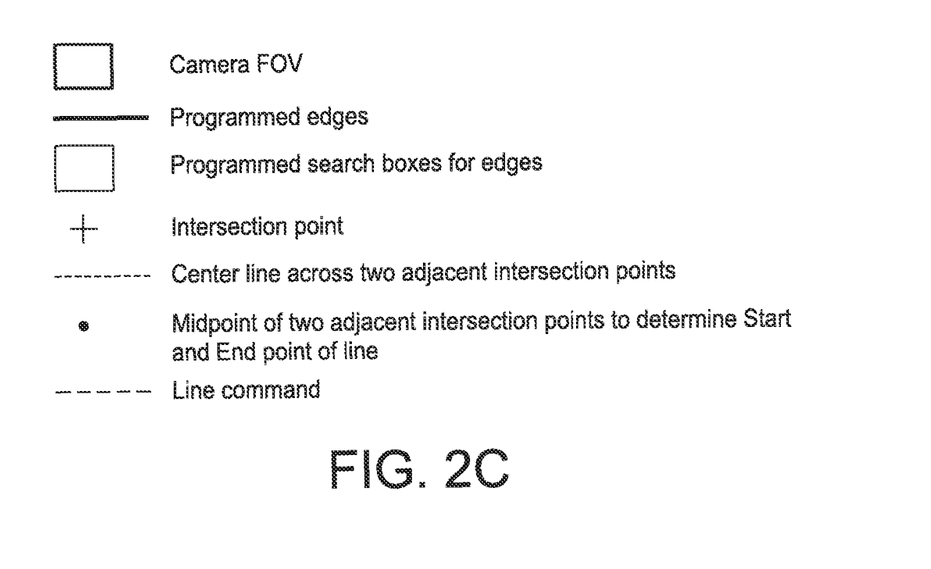
FIG. 2C is a legend for the schematic representations shown in FIGS. 2A and 2B.

Referring to FIGS. 2A, 2B and 2C, FIG. 2A illustrates two electronic substrates. A first electronic substrate 40 and a second electronic substrate 42 are positioned next to each other. In the shown example, the first electronic substrate 40 and the second electronic substrate 42 are skewed with respect to each other, meaning that adjacent edges of the electronic substrates are not parallel to one another. This skew is exaggerated in the drawings for the purpose of illustrating aspects of the present disclosure.

As shown in FIG. 2A, with reference to the legend provided in FIG. 2C, there are two separate camera fields of view (FOV) 44, 46. The top field of view 44 shows top portions of the first electronic substrate 40 and the second electronic substrate 42. The bottom field of view 46 shows bottom portions of the first electronic substrate 40 and the second electronic substrate 42. Within each field of view 44, 46, programmed search boxes for edges, each indicated at 48, are identified and represented. The programmed search boxes 48 are configured to identify features of the first electronic substrate and the second electronic substrate, such as vertical and horizontal edges of the electronic substrates 40, 42. Further, within each field of view 44, 46, programmed edges, each indicated at 50, are identified and represented. The programmed edges represent the vertical and horizontal edges of the electronic substrates 40, 42

As shown in FIG. 2B, with reference to the legend provided in FIG. 2C, the two camera fields of view 44, 46 are shown having different notations. The programmed edges 50 are noted in this view. For each corner of the first electronic substrate 40 and the second electronic substrate 42 having intersected programmed edges, an intersection point, each indicated at 52, is identified. As shown in the top field of view 44, two adjacent intersection points 52 are connected by a centerline 54 that extends across the intersection points. A midpoint, indicated at 56, is identified within the centerline 54. Similarly, as shown in the bottom field of view 46, two adjacent intersection points 52 are connected by a centerline 58 that extends across the intersection points. A midpoint, indicated at 60, is identified with the centerline 58.

Based on the two midpoints 56, 60 identified along the top centerline 54 and along the bottom centerline 58, respectively, a line command 62 can be generated to enable the controller to generate a path for the dispensing system to dispense material between the first electronic substrate 40 and the second electronic substrate 42. Specifically, a dispensing unit of the dispensing system, e.g., dispensing unit 14 or 16, can be programmed by the controller 18 to dispense material along a path based on the line command 62.

The intersect command determines an exact corner through the intersection of two non-parallel edges. These non-parallel edges can be located at any angle with respect to each other depending on the product. It should be understood that the non-parallel edges can include curvatures that would deviate from a straight line to form arcs. These edges are programmed within an intersect command template to produce an intersection point where the edges intersect with each other. This intersection point is used to dispense a dot or line command at a programmed position offset.

Figure 3A:
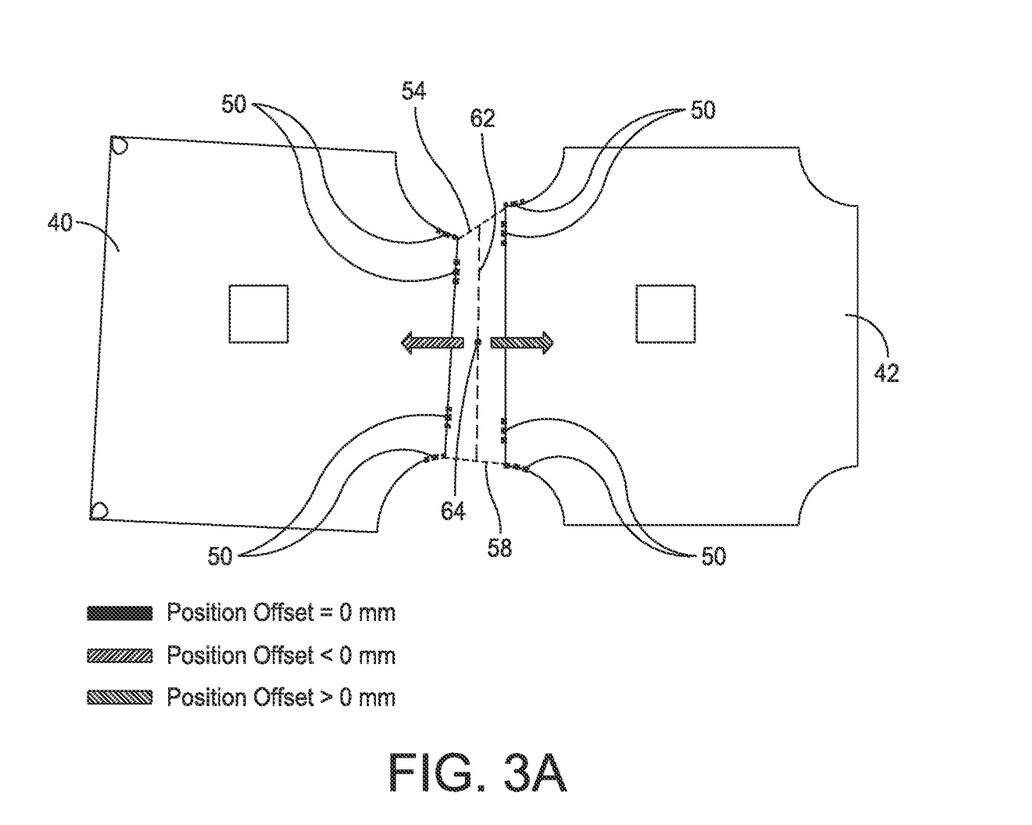
FIGS. 3A and 3B are schematic representations similar to FIG. 2B showing position offset of the two components of the electronic substrate.
Figure 3B:
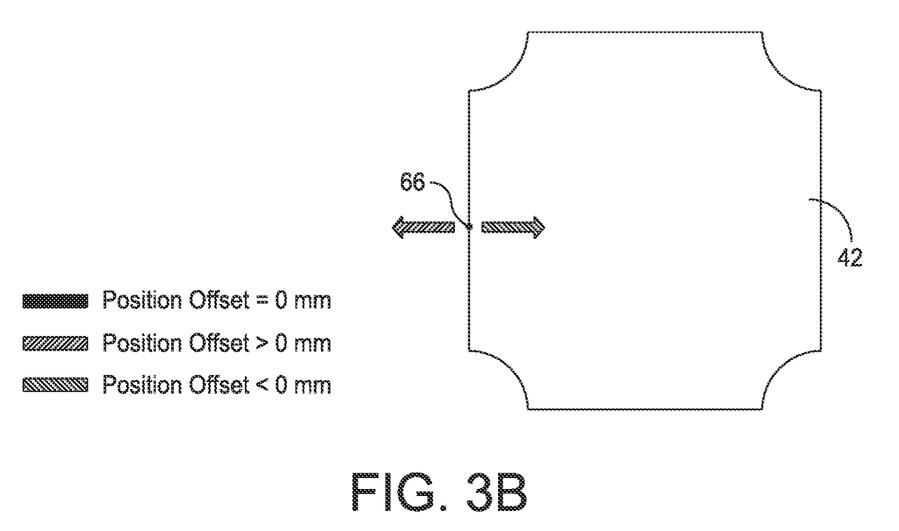

Referring to FIGS. 3A and 3B, a position offset is measured as the offset distance away from intersect point in the direction perpendicular to the edge. The position offset distance can be negative, positive or zero ("0"). A position offset of zero ("0") means the center of a gap between the programmed edges 50 of electronic substrates. With a single electronic substrate, e.g., electronic substrate 40, a position distance of zero ("0") falls at a midpoint of the intersection points on the programmed edge of the respective electronic substrate. In FIG. 3A, the midpoint along line command 62 is designated as 64. In FIG. 3B, the midpoint along line command 62 is designated as 66. The position offset direction can vary based on which electronic substrate is chosen first to program the edges. The position offset away from the edge is considered positive while towards the edge is considered negative.

Figure 4:
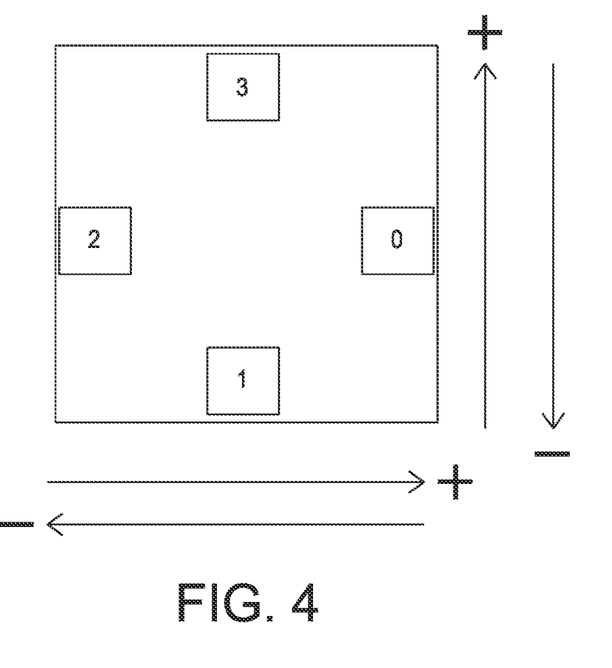
FIG. 4 is a schematic representation of a component showing position distance.

Referring to FIG. 4, a position distance is measure as the distance from the intersection point in either direction on the chosen edge. The position distance can be negative positive or zero ("0"). A length of the position distance in an upward direction from the midpoint 66 of the intersection points is termed positive while in a downward direction is termed negative for vertical edges i.e., chip edge 0 and 2. A length of the position distance in a righthand direction from the midpoint 66 of the intersection points is termed positive while in a lefthand direction is termed negative for horizontal edges i.e., chip edge 1 and 3.

Figure 5:
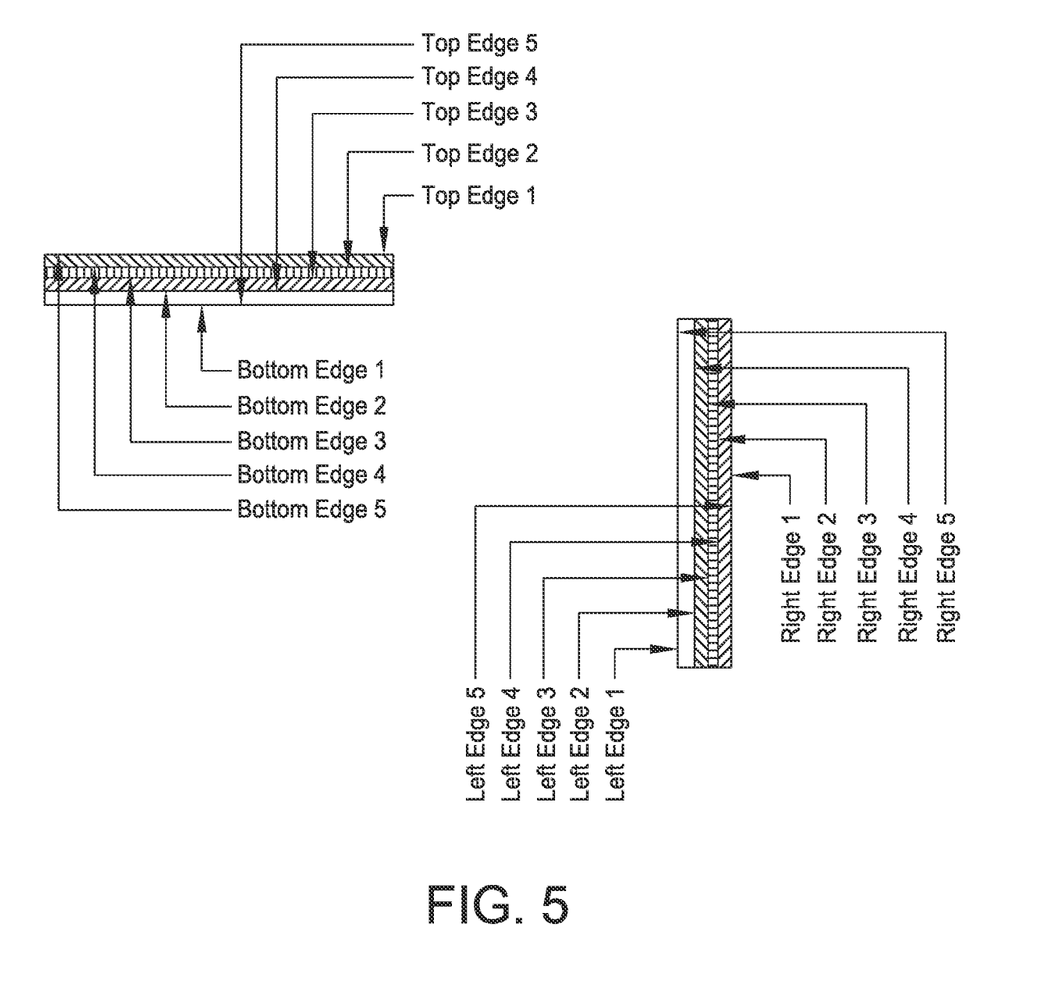
FIG. 5 is an image of a drop-down menu in which a user can select an edge of the component.

Referring to FIG. 5, images taken by the vision system, e.g., vision system 30, capture the target or reference points on the product. These reference points are programmed as model templates or regions of interest which are identified from the captured raw images. Images are composed of pixels with each pixel being the smallest picture element the vision system can uniquely identify. Each pixel is interpreted as Black or White with possible shades of gray (256 possible shades). A large number of same shade pixels in close proximity define an image. Camera measures in pixels while system measures either in inches (in) or millimeters (mm).

A user can choose an edge from the selection drop down menu. As shown in FIG. 5, for the horizontal feature, approaching from the top direction would identify the top edges as Top Edge 1, Top Edge 2. Top Edge 3, Top Edge 4 and Top Edge 5 and approaching from the bottom direction would identify the bottom edges as Bottom Edge 1, Bottom Edge 2, Bottom Edge 3, Bottom Edge 4 and Bottom Edge 5. Similarly, for the vertical feature, approaching from the right direction would identify the righthand edges as Right Edge 1, Right Edge 2, Right Edge 3, Right Edge 4 and Right Edge 5 and approaching from the left direction would identify the lefthand edges as Left Edge 1, Left Edge 2. Left Edge 3, Left Edge 4 and Left Edge 5. As mentioned, the user can choose an edge that best reflects the edge of the feature by using a drop down menu. These edges can be highlighted by the software performing this function and represented to the user by a user interface, such as a graphic user interface (GUI).

Edges are extracted based on analyzing gray level intensity transitions of pixels in images. Different thresholding modes can be used to extract edges based on contrast variations, noise, and non-uniform illumination. To further select the correct edges, the polarity of the edge can be selected which indicates the edge is either lighter or darker than the image's background color and edges of a specified user length are only considered as valid edges.

Figure 6:
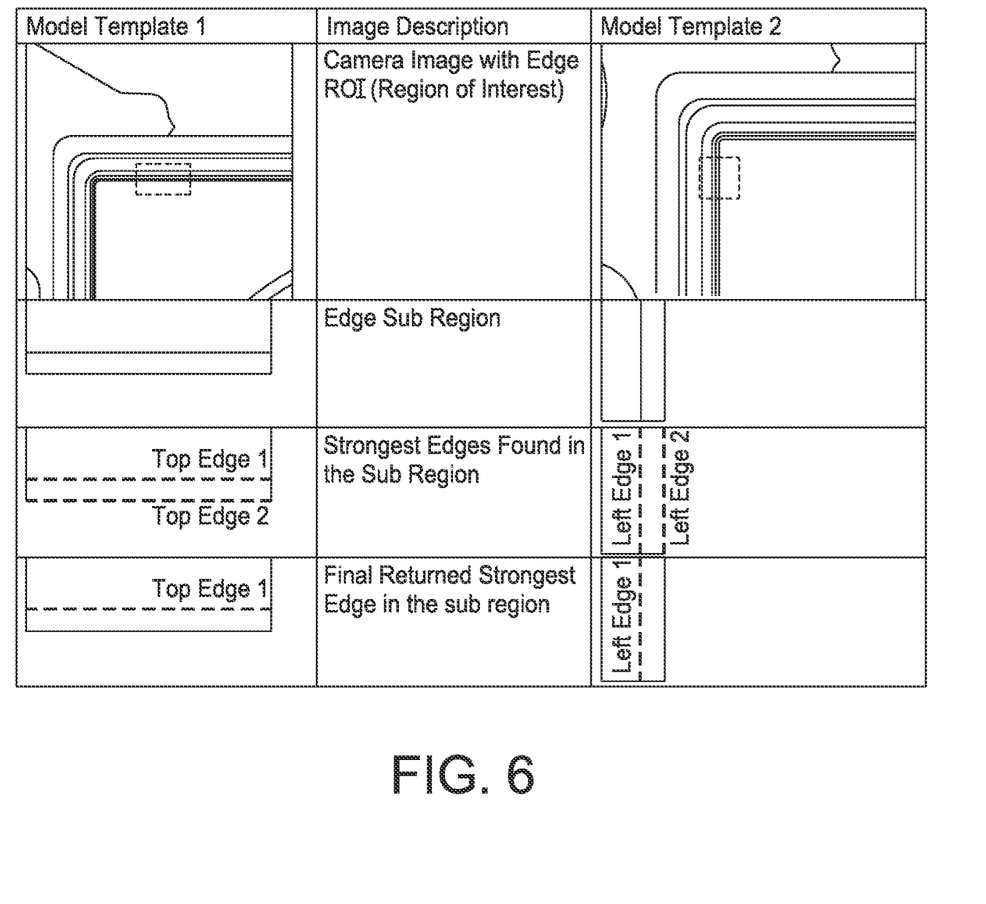
FIG. 6 show image descriptions of model templates of the edge selected by the user.
Figure 7:
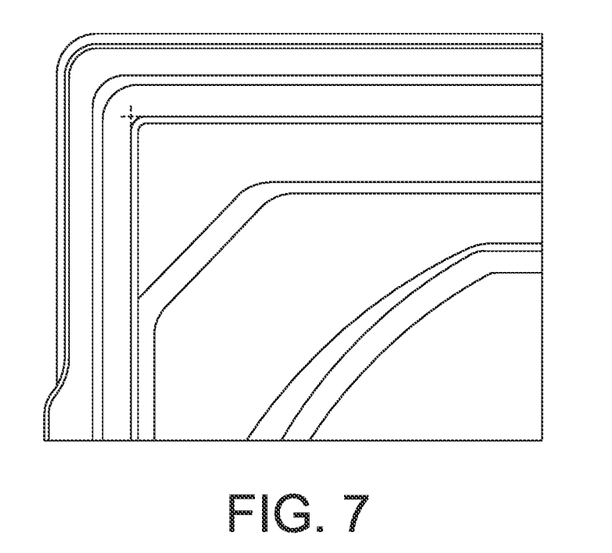
FIG. 7 shows an intersection point based on the model templates.
Figure 8:
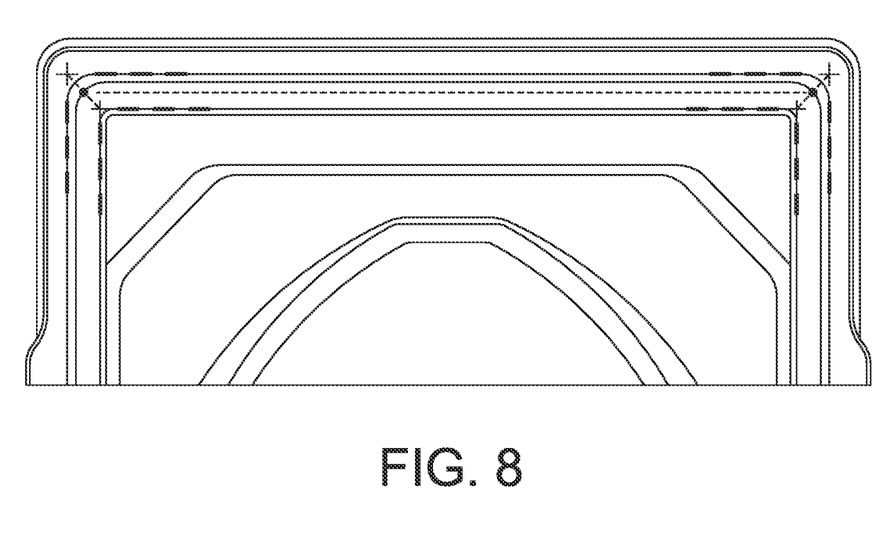
FIG. 8 shows a user generating a line from a calculated midpoint toward another found midpoint if two intersection points are located.

Referring to FIGS. 6 and 7, a model template, identified as Model Template 1, is programmed to have the top edge 1 while another model template, identified as Model Template 2, is programmed to have the left edge 1. Intersection point is marked as a cross sign as shown in FIG. 6.

Referring FIG. 7, if two intersection points are located, then user should be able to start a line from the calculated midpoint towards the other found midpoint on the other end of the chip which would be the end of line. This way line can be dispensed in the center of found gap.

A method of performing a dispense operation includes acquiring a first image of a first portion of two adjacent features including a first feature of a first component and a second feature of a second component. Next, the method includes acquiring a second image of a second portion of two adjacent features including a third feature of the first component and a fourth feature of the second component. Next, the method includes assigning programmed search boxes to edges of the first feature and to edges of the second feature and assigning programmed search boxes to edges of the third feature and to edges of the fourth feature. Next, the method includes identifying programmed edges of the first feature and the second feature, each of the first feature and the second feature including a horizontal programmed edge and a vertical programmed edge. Next, the method includes identifying programmed edges of the third feature and the fourth feature, each of the third feature and the fourth feature including a horizontal programmed edge and a vertical programmed edge. For each of the first feature and the second feature, the method further includes identifying an intersection point of the horizontal programmed edge and the vertical programmed edge and determining a first centerline from the intersection point of the first feature to the intersection point of the second feature. For each of the third feature and the fourth feature, the method further includes identifying an intersection point of the horizontal programmed edge and the vertical programmed edge and determining a second centerline from the intersection point of the third feature to the intersection point of the fourth feature. Next, the method includes determining a midpoint of the first centerline and determining a midpoint of the second centerline. After determining the midpoints, an intersect command is determined for a dispense operation between the first component and the second component. At this point the dispense operation is performed.

For each intersection point of the first feature and the second feature, and for each intersection point of the third feature and the fourth feature, the method further may include measuring an offset distance from the intersection point in a direction perpendicular to an edge of the feature, with the offset distance being negative, positive or zero. For each intersection point of the first feature and the second feature, and for each intersection point of the third feature and the fourth feature, the method further may include measuring a position distance from the intersection point in one of two directions from an edge of the feature. The position distance in an upward direction from the midpoint of found intersection points is positive and the position distance in a downward direction from the midpoint of found intersection points is negative. The position distance in a righthand direction from the midpoint of found intersection points is positive and the position distance in a lefthand direction from the midpoint of found intersection points is negative.

The method further may include selecting an edge from several edges from a graphic user interface. Specifically, a user can select a vertical edge from a plurality of vertical edges and select a horizontal edge from a plurality of horizontal edges.

Various controllers, such as the controller 14, may execute various operations discussed above. Using data stored in associated memory and/or storage, the controller 14 also executes one or more instructions stored on one or more non-transitory computer-readable media, which the controller 14 may include and/or be coupled to, that may result in manipulated data. In some examples, the controller 14 may include one or more processors or other types of controllers. In one example, the controller 14 is or includes at least one processor. In another example, the controller 14 performs at least a portion of the operations discussed above using an application-specific integrated circuit tailored to perform particular operations in addition to, or in lieu of, a general-purpose processor. As illustrated by these examples, examples in accordance with the present disclosure may perform the operations described herein using many specific combinations of hardware and software and the disclosure is not limited to any particular combination of hardware and software components. Examples of the disclosure may include a computer-program product configured to execute methods, processes, and/or operations discussed above. The computer-program product may be, or include, one or more controllers and/or processors configured to execute instructions to perform methods, processes, and/or operations discussed above.

Having thus described several aspects of at least one embodiment of this disclosure, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method of depositing material on an electronic substrate with a dispensing system of the type including a frame, a dispensing unit gantry movably coupled to the frame, a dispensing unit coupled to the dispensing unit gantry, the dispensing unit being configured to deposit material onto the electronic substrate during a dispense operation, a vision system gantry coupled to the frame, and a vision system coupled to the vision system gantry, the vision system being configured to obtain one or more images of the electronic substrate having two adjacent features prior to performing the dispense operation, the method comprising:

acquiring a first image of a first portion of two adjacent features including a first feature of a first component and a second feature of a second component;
   acquiring a second image of a second portion of two adjacent features including a third feature of the first component and a fourth feature of the second component;
   assigning programmed search boxes to edges of the first feature and to edges of the second feature;
   assigning programmed search boxes to edges of the third feature and to edges of the fourth feature;
   identifying programmed edges of the first feature and the second feature, each of the first feature and the second feature including a horizontal programmed edge and a vertical programmed edge;
   identifying programmed edges of the third feature and the fourth feature, each of the third feature and the fourth feature including a horizontal programmed edge and a vertical programmed edge;
   for each of the first feature and the second feature, identifying an intersection point of the horizontal programmed edge and the vertical programmed edge;
   determining a first centerline from the intersection point of the first feature to the intersection point of the second feature;
   for each of the third feature and the fourth feature, identifying an intersection point of the horizontal programmed edge and the vertical programmed edge;
   determining a second centerline from the intersection point of the third feature to the intersection point of the fourth feature;
   determining a midpoint of the first centerline;
   determining a midpoint of the second centerline;
   determining an intersect line from the midpoint of the first enter line to the midpoint of the second center line for a dispense operation between the first component and the second component; and
   performing the dispense operation along the intersect line.

2. The method of claim 1, for each intersection point of the first feature and the second feature, and for each intersection point of the third feature and the fourth feature, further comprising measuring an offset distance from the intersection point in a direction perpendicular to an edge of the feature.

3. The method of claim 1, for each intersection point of the first feature and the second feature, and for each intersection point of the third feature and the fourth feature, further comprising measuring a position distance from the intersection point in one of two directions from an edge of the feature.

4. The method of claim 3, wherein the position distance in an upward direction from the intersect point is positive and the position distance in a downward direction from the intersection point is negative.

5. The method of claim 4, wherein the position distance in a righthand direction from the intersect point is positive and the position distance in a lefthand direction from the intersection point is negative.

6. The method of claim 1, wherein each image is composed of pixels with each pixel being the smallest picture element the vision system can uniquely identify and interpret as at least one of Black or White or shades of gray.

7. The method of claim 1, wherein a user can select an edge from several edges from a graphic user interface.

8. The method of claim 7, wherein the edge is one of a vertical edge from a plurality of vertical edges and a horizontal edge from a plurality of horizontal edges.

9. The method of claim 7, further comprising generating a model template of the edge.

10. A computer-readable medium comprising instructions which, when executed by a computer, cause the computer to carry out the method of:
acquiring a first image of a first portion of two adjacent features including a first feature of a first component and a second feature of a second component;
acquiring a second image of a second portion of two adjacent features including a third feature of the first component and a fourth feature of the second component;
assigning programmed search boxes to edges of the first feature and to edges of the second feature;
assigning programmed search boxes to edges of the third feature and to edges of the fourth feature;
identifying programmed edges of the first feature and the second feature, each of the first feature and the second feature including a horizontal programmed edge and a vertical programmed edge;
identifying programmed edges of the third feature and the fourth feature, each of the third feature and the fourth feature including a horizontal programmed edge and a vertical programmed edge;
for each of the first feature and the second feature, identifying an intersection point of the horizontal programmed edge and the vertical programmed edge;
determining a first centerline from the intersection point of the first feature to the intersection point of the second feature;
for each of the third feature and the fourth feature, identifying an intersection point of the horizontal programmed edge and the vertical programmed edge;
determining a second centerline from the intersection point of the third feature to the intersection point of the fourth feature;
determining a midpoint of the first centerline;
determining a midpoint of the second centerline;
determining an intersect line from the midpoint of the first centerline to the midpoint of the second centerline for a dispense operation between the first component and the second component; and
performing the dispense operation along the intersect line.

11. The computer-readable medium of claim 10, for each intersection point of the first feature and the second feature, and for each intersection point of the third feature and the fourth feature, further comprising measuring an offset distance from the intersection point in a direction perpendicular to an edge of the feature.

12. The computer-readable medium of claim 10, for each intersection point of the first feature and the second feature, and for each intersection point of the third feature and the fourth feature, further comprising measuring a position distance from the intersection point in one of two directions from an edge of the feature.

13. The computer-readable medium of claim 12, wherein the position distance in an upward direction from the intersect point is positive and the position distance in a downward direction from the intersection point is negative.

14. The computer-readable medium of claim 13, wherein the position distance in a righthand direction from the intersect point is positive and the position distance in a lefthand direction from the intersection point is negative.

15. The computer-readable medium of claim 10, wherein each image is composed of pixels with each pixel being the smallest picture element the vision system can uniquely identify and interpret as at least one of Black or White or shades of gray.

16. The computer-readable medium of claim 10, wherein a user can select an edge from several edges from a graphic user interface.

17. The computer-readable medium of claim 16, wherein the edge is one of a vertical edge from a plurality of vertical edges and a horizontal edge from a plurality of horizontal edges.

18. The computer-readable medium of claim 16, further comprising generating a model template of the edge.

* * * * *